UNITED STATES PATENT OFFICE.

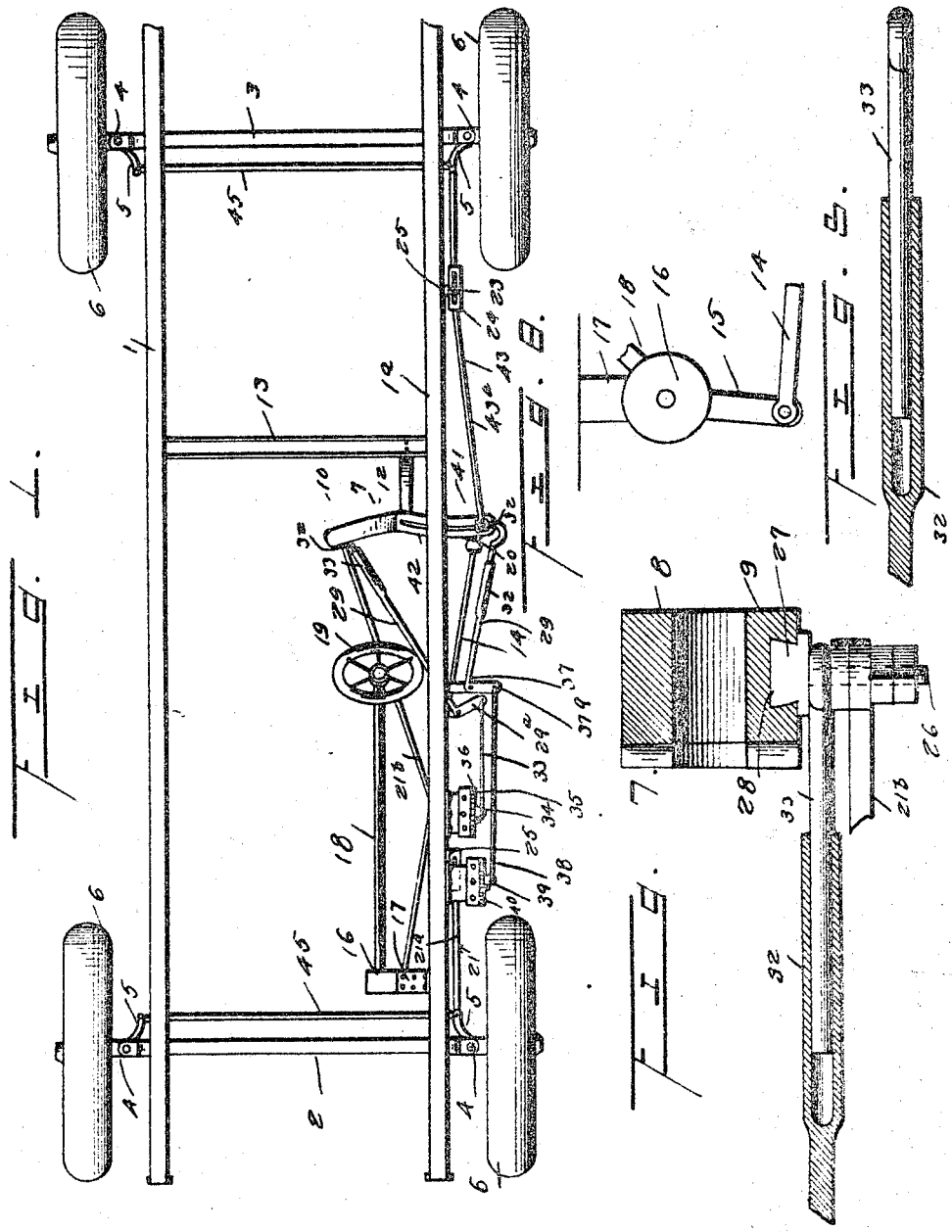

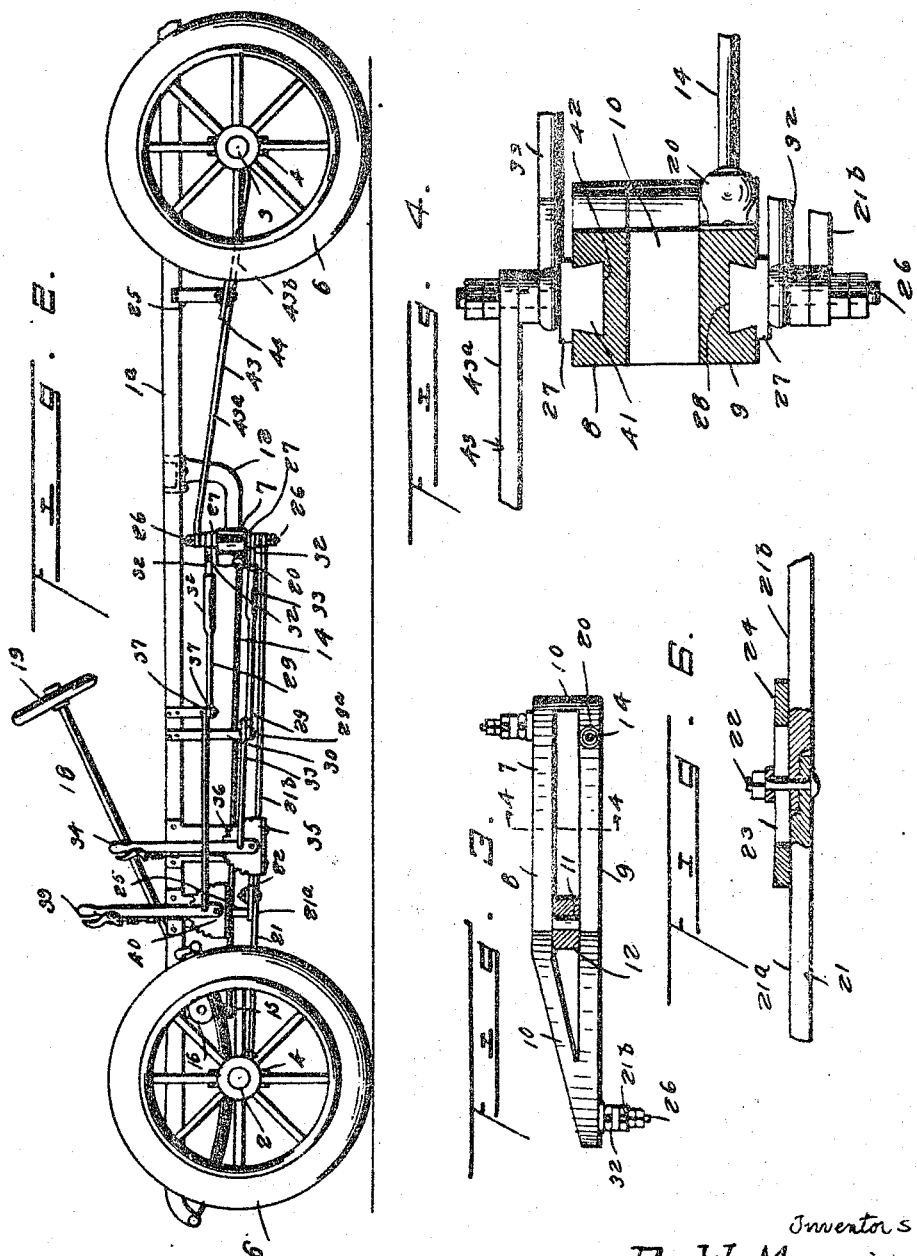

ROBERT W. MORRICK AND EDWARD H. DREWS, OF MADISON, WISCONSIN.

STEERING APPARATUS.

1,308,504.   Specification of Letters Patent.   Patented July 1, 1919.

Application filed January 10, 1919.  Serial No. 270,553.

*To all whom it may concern:*

Be it known that we, ROBERT W. MORRICK and EDWARD H. DREWS, citizens of the United States, residing at Madison, in the county of Dane and State of Wisconsin, have invented certain new and useful Improvements in Steering Apparatus; and we do hereby declare the following to be a full, clear, and exact description of the invention, such as will enable others skilled in the art to which it appertains to make and use the same.

This invention relates to steering apparatuses, and more particularly to a steering apparatus especially adapted for use in connection with either three or four wheel drive vehicles.

One of the main objects of the invention is to provide a steering apparatus of simple construction and operation which may be readily applied to either a three wheel or a four wheel drive automobile truck and traction engine by means of which very short turns may be made and either the front or the rear wheels of the vehicle may be locked against movement, the other wheels being used for steering purposes.

A further object is to provide a steering apparatus in which all of the wheels of the vehicle may be set in the same direction and at the same angle so as to permit the vehicle to travel sidewise, when desired.

Further objects will appear from the detailed description.

In the drawings:

Figure 1 is a top plan view of an automobile frame of conventional construction employing a four wheel drive showing a steering apparatus constructed in accordance with our invention applied.

Fig. 2 is a side view.

Fig. 3 is a front view of the rockable steering frame.

Fig. 4 is a section taken substantially on line 4—4 of Fig. 3.

Fig. 5 is a detail of one of the shifting levers.

Fig. 6 is a detail of the plate for guiding the steering rod.

Fig. 7 is a detail of the connections between the shifting rod for the steering frame and the frame.

Fig. 8 is a detail side view of the connections between the steering shaft and the shifting rod.

In Fig. 1 of the drawings we have illustrated a frame 1 which may be of any suitable or preferred construction, this frame being supported by the front and rear axles 2 and 3, respectively, connected thereto in the usual manner and provided at their opposite ends with suitable forks in which are rockably mounted wheel spindles 4 provided with the inwardly directed angularly disposed arms 5 secured thereto, these spindles carrying the wheels 6 mounted thereon. The wheels may be rotated by means of any of the now well known three or four wheel drive mechanisms from the engine of the automobile truck or traction engine, the engine and driving connections not being shown as they form no part of our invention. The frame 1 is thus mounted on the four ground wheels so as to be supported thereby, these wheels being mounted for rocking movement about vertical axes for steering the frame in any direction so as to enable short turns to be made. It will be understood, of course, that the frame may be provided with but three supporting wheels, if desired, a three wheel drive being employed in this latter case.

A steering frame designated generally by 7 is positioned at the center or any part of vehicle frame 1. This steering frame is in the form of a yoke or link and comprises an upper arm 8 and a lower arm 9 connected thereto at its ends by the end walls or webs 10. The arms 8 and 9 are braced at their intermediate portions by a vertical cylindrical column 11. This column fits snugly through a split supporting arm 12 which is horizontally disposed and depends from transverse brace bars 13 secured to the side sills of the frame 1, arm 12 being disposed longitudinally of the frame. The steering frame 7 is thus rockably supported for movement about a vertical axis. A shifting rod 14 is pivotally secured at its forward end to a steering arm 15 projecting radially from a steering shaft rotatably mounted in a supporting casing 16 which is supported by suitable hangers 17 from the frame 1, the steering shaft being rocked in suitable direction by the usual worm gearing contained within the casing and operated by means of the steering post 18 provided adjacent its upper end with a steering wheel 19. At its rearward end, the shifting rod 14 is secured to steering frame 7, adjacent one end of lower arm 9 thereof by a ball and socket joint, as at 20. The steering frame may thus be rocked in either direction desired about its axis by means of the steering wheel through the medium of the shifting rod 14 and associated parts.

A steering rod designated generally by 21 is pivotally secured at its forward end to the inner end of the arm 5 of spindle 4 of the forward lefthand wheel 6. This rod is composed of two sections 21$^a$ and 21$^b$ which are pivotally secured together for movement about a vertical axis by means of a pivot pin 22 which is inserted through a slot 23 in a supporting and guide plate 24 supported by an arm 25 projecting from the side sill or bottom of the frame 1. This plate serves to support the rod 21 so as to prevent sagging thereof while permitting proper movement of this rod for steering purposes, for which purpose a washer is secured about the pin 22 above plate 24, jamb nuts being screwed on this pin above the washer as shown in Fig. 6. The rearward end of member 21$^b$ of rod 21 is pivotally secured by means of a pivot pin 26 to a block 27 the body of which is of dovetail construction, which is slidable in a dovetail groove 28 formed in the under face of arm 9. This groove is of arcuate outline, being curved on an arc concentric with pivot pin 22 so as to permit the block 27 to be moved into any desired position longitudinally of the groove when the steering frame 7 is in normal position. By moving the block 27, the point of attachment of the steering rod to the steering frame may be varied so as to rock the wheel spindles in proper direction by rocking this frame, in a manner to be described.

A shifting bell crank lever 29 is pivotally mounted at its angle for rocking movement about a vertical axis on a stub shaft 30 carried by a bracket 31 secured to the side sill 1$^a$ of frame 1. The inner end of this shifting lever extends inwardly and rearwardly of the frame and is slidable in a tubular member 32, the rearward end of which is pivotally secured about the pivot pin 26 of block 27. This provides a telescopic construction for the inner arm of the bell crank so as to permit expansion and contraction thereof to accommodate movement of the block in the groove of arm 9. The outer arm 29$^a$ of the bell crank lever is connected by a pull rod 33 to a lever 34 rockably mounted on a stub shaft 35 projecting from the side sill 1$^a$. This lever is provided with the usual spring pressed detent coöperating with a rack 36 for securing the lever in rocked adjustment. By means of lever 34, the block 27 may be shifted longitudinally of slot or groove 28 so as to be positioned at either end thereof, the ends of this groove being closed, or at the center of the groove so as to bring the pivot pin 26 into axial alinement with the column or pin 11 of the steering frame 7.

A second bell crank lever 37 is rockably mounted on the side sill 1$^a$ of the frame above and in rear of bell crank 29, and has the outer end of its outer arm 37$^a$ connected by a pull rod 38 to a lever 39 rockably mounted on the side sill or underneath 1$^a$ and provided with a detent coacting with a rack 40 for securing the lever in adjustment. The inner end portion of the inner arm of this bell crank lever is of telescopic construction, being constructed similarly to the inner end portion of lever 29, and is pivotally connected to a block 41 of dovetail or square construction slidable in a dovetail groove 42 provided in the upper face of the upper arm 8 of steering frame. A steering rod 43 corresponding to rod 21 and composed of the pivotally connected sections 43$^a$ and 43$^b$, is pivotally secured at its forward end to the block 41. This steering rod is slidably supported at its joint by a plate 44 corresponding to plate 24, and the rearward section 43$^b$ of this rod is pivotally secured to the inner end of the steering arm 6 of the spindle 4 of the left rear wheel. As will be noted more clearly from Fig. 1, the groove 42 extends but one-half the length of the steering frame, from the lefthand end of upper arm 8 thereof to the center of said arm. It will be understood, however, that this groove can extend the full length of the frame, if desired or deemed necessary. By shifting the block 41 into proper position in the groove 42, and rocking the steering frame in proper direction, the rear wheel to which rod 43 is connected will be rocked about the axis of its spindle. The steering arms of the spindles 4 of the wheels 6 are connected by the connecting rod 45 in the well known manner so that when one of the front or rear wheels is rocked, simultaneous and similar movement will be imparted to the other wheel.

When the two blocks 27 and 41 are moved into such position as to be at the center of the frame, these blocks are in axial alinement with each other and with the column or pivot pin 11 of the frame. With the blocks in this position, the steering rods 21 and 43 are locked against movement so that the wheels 6 will be maintained in a straight forward position so as to cause forward travel of the vehicle even though the frame 7 may be rocked through the usual steering gear. If it is desired to make a sharp turn to the left, the blocks 27 and 41 are shifted into the position shown in Fig. 1 so as to be at the inner and outer ends of the arms 9 and 8, respectively, of the steering frame. When the blocks have been moved into this position, the shifting rod 14 is forced rearwardly through the medium of the steering shaft and associated parts so as to rock frame 7 about its axis forcing steering rod 21 forwardly and steering rod 43 rearwardly. This results in rocking the two front wheels toward the lefthand side of the vehicle, the two rear wheels being rocked in opposite direction thus permitting a sharp turn to be made. If it is desired to turn to the right, with the blocks in the position shown, the shifting rod 14 is forced forwardly so as to force the steering rod 21 rearwardly and the steering rod 43 forwardly. This reverses the direction in which the front and rear wheels are rocked thus permitting a sharp turn to the right to be made. If it is desired to use the front wheels only in the steering operation, the block 41 is moved toward the inner end of the groove 42 so as to be on center with the pivot pin 11 of the steering frame, after which the frame may be rocked without affecting the rear wheels of the vehicle which are thus locked in straight forward position, the front wheels being rocked in either direction through the medium of the frame and associated parts. In a similar manner, the front wheels may be locked against movement and the rear wheels utilized for steering, when desired, as when backing the vehicle. Also, by moving the block 27 to the outer end of groove 28, block 41 remaining in the outer end of groove 42, and then rocking the steering frame 7, simultaneous and similar movement may be imparted to all four wheels of the vehicle so as to permit sidewise travel thereof as when it is desired to cross a street or thoroughfare without turning the vehicle around in the ordinary manner. For instance, if it is desired to travel sidewise in a lefthand direction, the block 27 is moved into the outer end of groove 28, the shifting rod 14 being pulled forwardly by the steering shaft so as to cause forward movement of the steering rod 21 and of steering rod 43. This results in rocking the front wheels of the vehicle into such position as to be directed forwardly and laterally of the vehicle and toward the lefthand side thereof, the rear wheels being simultaneously moved into a similar position. With the four wheels set in this manner, the vehicle can readily travel to the left and slightly forwardly so as to readily cross a street or thoroughfare diagonally of the same. This eliminates the usual necessary turning of the vehicle which occurs in vehicles using steering mechanisms of ordinary construction. While we have illustrated and described the invention as applied to a four wheel vehicle, it is to be understood that it may be equally well applied to a three wheel vehicle by replacing either the two front or the two rear wheels by a single wheel, in either case, the construction and principle of operation of the steering apparatus being the same.

It will be evident that there may be slight changes made in the construction and arrangement of the details of our invention without departing from the field and scope of the same, and we intend to include all such variations, as fall within the scope of the appended claims, in this application in which a preferred form only of our invention is disclosed.

What we claim is:

1. The combination with a vehicle frame, of front and rear wheel spindles rockably mounted therein, a steering frame rockably supported by said vehicle frame, front and rear steering rods connected to the front and rear spindles, respectively, for rocking the same, connections between said steering frame and the steering rods for causing movement of said rods to rock said spindles when the steering frame is rocked, the connections for said rods being independently adjustable longitudinally of the steering frame so as to be positioned at either side of the axis thereof or at the axis of said frame, optionally, and means for rocking said steering frame.

2. The combination with a vehicle frame and wheel spindles rockably supported thereby, of a steering frame rockably supported by the vehicle frame intermediate the ends thereof for rocking movement about a vertical axis, said steering frame being provided with spaced upper and lower arms, front and rear steering rods connected to the front and rear spindles, respectively, the inner ends of said rods being connected to the respective arms of the steering frame so as to be adjustable longitudinally thereof, means for adjusting the points of connection between the inner ends of the steering rods and the arms of said steering frame independently, and means for rocking the steering frame so as to rock the spindles for steering purposes.

3. The combination with a vehicle frame, of wheel spindles rockably supported at the front and rear thereof, a steering frame rockably supported by the vehicle frame for movement about a vertical axis and having spaced upper and lower arms, said arms being slotted longitudinally and passing immediately above and beneath the pivot pin of said steering frame, blocks slidable in said slots, front and rear steering rods connected to the front and rear spindles and to the blocks in the lower and upper arms of the steering frame, respectively, means for shifting said blocks in the slots of said arms independently and for securing them in independent adjustment, and means for rocking the steering frame.

In testimony whereof we affix our signatures in presence of two witnesses.

ROBERT W. MORRICK.
EDWARD H. DREWS.

Witnesses:
EARL S. BURWELL,
EDWIN F. GIBBS.

Copies of this patent may be obtained for five cents each, by addressing the "Commissioner of Patents, Washington, D. C."